United States Patent
Kimpara

(10) Patent No.: US 12,344,351 B2
(45) Date of Patent: Jul. 1, 2025

(54) ELECTRIC MOTOR-ASSISTED BICYCLE AND MOTOR CONTROL APPARATUS

(71) Applicant: YAMAHA HATSUDOKI KABUSHIKI KAISHA, Iwata (JP)

(72) Inventor: Yuki Kimpara, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 785 days.

(21) Appl. No.: 17/579,850

(22) Filed: Jan. 20, 2022

(65) Prior Publication Data

US 2022/0242521 A1    Aug. 4, 2022

(30) Foreign Application Priority Data

Jan. 29, 2021   (JP) ................................. 2021-013800

(51) Int. Cl.
*B62M 6/50*    (2010.01)
*B62M 6/55*    (2010.01)

(52) U.S. Cl.
CPC ................ *B62M 6/50* (2013.01); *B62M 6/55* (2013.01)

(58) Field of Classification Search
CPC . B62M 6/50; B62M 6/55; B62M 6/45; B62M 6/40; B62J 45/411; B62J 45/4151; B62J 45/4152; B62J 45/415; B62J 45/41; B61J 45/4151; B62K 11/00; B62K 17/00; B60L 2200/12
USPC .................................................... 180/206.7
See application file for complete search history.

(56) References Cited

U.S. PATENT DOCUMENTS

| | | | |
|---|---|---|---|
| 9,193,407 B2 * | 11/2015 | Muth | B60B 27/0068 |
| 2017/0297651 A1 * | 10/2017 | Tsuchizawa | B60W 10/11 |
| 2019/0248444 A1 | 8/2019 | Katsuki et al. | |

FOREIGN PATENT DOCUMENTS

| | | | | |
|---|---|---|---|---|
| EP | 3901025 A1 * | 10/2021 | | B62J 45/412 |
| JP | 2006123756 A | 5/2006 | | |
| JP | 2019-116241 A | 7/2019 | | |
| JP | 2019-137231 A | 8/2019 | | |
| JP | 2020032899 A * | 3/2020 | | B62J 45/415 |

OTHER PUBLICATIONS

English translation of JP2020032899 A through Espacenet. Original document provided (Year: 2020).*

* cited by examiner

*Primary Examiner* — Valentin Neacsu
*Assistant Examiner* — Nathaniel William Watkins
(74) *Attorney, Agent, or Firm* — Keating & Bennett, LLP

(57) ABSTRACT

An electric motor-assisted bicycle includes a vehicle body motion sensor to detect a change in an attitude of a vehicle body relative to a road surface, a torque sensor to detect a pedal force on a pedal, a motor to generate an assist force to be added to the pedal force, a motor controller configured or programmed to control the assist force applied by the motor depending on the pedal force, and a sharp-curve-traveling detector to detect that the electric motor-assisted bicycle is traveling along a sharp curve with the vehicle body tilted relative to its upright state to the left or the right. The motor controller is configured or programmed to control the assist force depending on the detection result from the sharp-curve-traveling detector.

17 Claims, 8 Drawing Sheets

ELECTRIC MOTOR-ASSISTED BICYCLE AND MOTOR CONTROL APPARATUS

CROSS-REFERENCE TO RELATED APPLICATION

This application is based upon and claims the benefit of priority to Japanese Patent Application No. 2021-013800, filed on Jan. 29, 2021, the entire contents of which are hereby incorporated herein by reference.

BACKGROUND OF THE INVENTION

1. Field of the Invention

The present invention relates to an electric motor-assisted bicycle and a motor control apparatus for an electric motor-assisted bicycle.

2. Description of the Related Art

In an electric motor-assisted bicycle, a motor generates an assist force that is added to a pedal force applied to a pedal by the rider to provide assistance. The assist force applied by the motor is controlled depending on the pedal force. In addition to the pedal force, information from sensors included in the electric motor-assisted bicycle may be used to control the assist force applied by the motor.

JP 2019-116241 A discloses a bicycle including a motor that provides a drive source for its electric-motor assistance function, a 6-axis sensor for measuring the accelerations in the three axes perpendicular to one another and the angular velocities about the three axes, and a control unit for controlling the output of the motor based on measurements from the 6-axis sensor.

JP 2019-137231 A discloses a control apparatus for a human-driven vehicle that includes a control unit for controlling a motor that assists the propulsion of the vehicle and, when the running speed of the vehicle is below a predetermined speed, controlling the motor depending on the human-powered driving force. This control unit changes the predetermined speed depending on the state of the vehicle and/or the condition of the road on which the vehicle is traveling, and does not assist the propulsion of the vehicle when the running speed of the vehicle is at or above the predetermined speed.

SUMMARY OF THE INVENTION

An electric motor-assisted bicycle according to a preferred embodiment of the present invention includes a vehicle body motion sensor to detect a change in an attitude of a vehicle body of the electric motor-assisted bicycle relative to a road surface; a torque sensor to detect a pedal force on a pedal connected to a crankshaft of the electric motor-assisted bicycle; a motor to generate an assist force added to the pedal force; a motor controller configured or programmed to control the assist force applied by the motor depending on the pedal force; and a sharp-curve-traveling detector to detect that the electric motor-assisted bicycle is traveling along a sharp curve with the vehicle body tilted by a predetermined angle or greater relative to an upright state based on information acquired by the vehicle body motion sensor. The motor controller is configured or programmed to control the assist force depending on a detection result from the sharp-curve-traveling detector.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
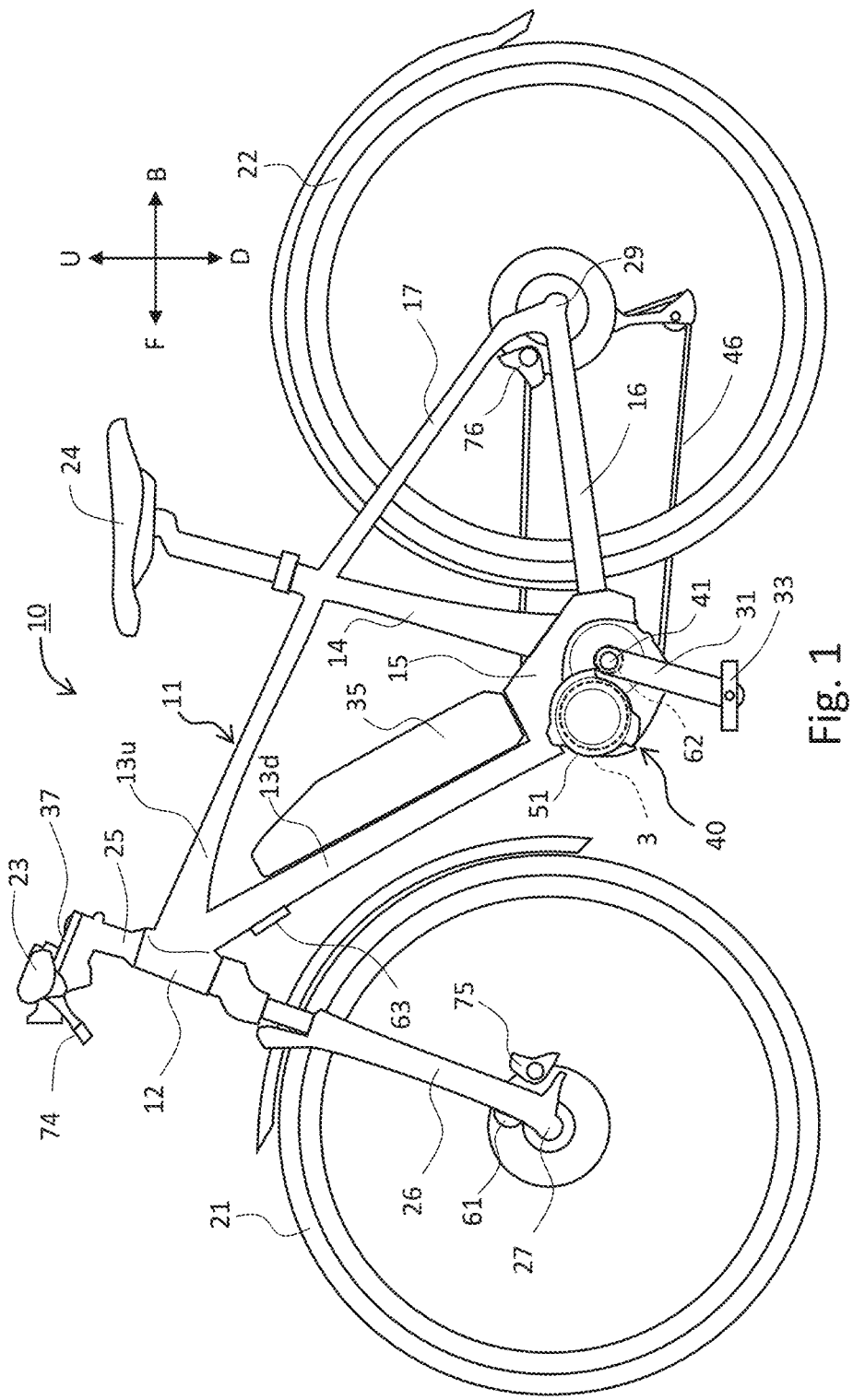
FIG. 1 is a left side view of an electric motor-assisted bicycle according to a preferred embodiment of the present invention.

Various running conditions of a bicycle are to be expected. The inventor of preferred embodiments of the present invention investigated individual running conditions to improve the assist feeling experienced by a rider when the motor's assistance is added to the pedal force. The inventor's investigation revealed that, while the bicycle is traveling along a curve, the addition of an assist force sometimes makes the rider feel as if the line of travel has swung outwardly with respect to the turn. The inventor also discovered that, since the rider usually does not push on the pedals during a turn of the bicycle, the rider sometimes feels that there is insufficient assistance during or after the turn.

In view of this, it is preferable to provide an electric motor-assisted bicycle that is able to improve the assist feeling experienced when the bicycle travels along a curve.

Preferred embodiments of the present invention improve the assist feeling of an electric motor-assisted bicycle experienced when the bicycle travels along a curve.

The inventor conducted research to find an arrangement that would improve the assist feeling during traveling through curves. The inventor examined the assist feeling experienced by the rider for various curve-traveling conditions. The examination revealed that the motor control often needs to be adjusted especially when the bicycle is traveling along a sharp curve with the vehicle body tilted relative to its upright state. That is, the inventor discovered that the assist feeling is improved by adjusting the control of the assist force applied by the motor when the electric motor-assisted bicycle is traveling along such a sharp curve that causes the vehicle body to tilt relative to its upright state. The inventor invented the preferred embodiments of the present invention described below based on these discoveries.

An electric motor-assisted bicycle according to a preferred embodiment of the present invention includes a vehicle body motion sensor to detect a change in an attitude of a vehicle body of the electric motor-assisted bicycle relative to a road surface, a torque sensor to detect a pedal force on a pedal connected to a crankshaft of the electric motor-assisted bicycle, a motor to generate an assist force to be added to the pedal force, a motor controller configured or programmed to control the assist force applied by the motor depending on the pedal force, and a sharp-curve-traveling detector to detect that the electric motor-assisted bicycle is traveling along a sharp curve with the vehicle body tilted relative to an upright state based on information acquired by the vehicle body motion sensor. The motor controller controls the assist force depending on a detection result from the sharp-curve-traveling detector.

In the above-described electric motor-assisted bicycle, the sharp-curve-traveling detector detects that the electric motor-assisted bicycle is traveling along a sharp curve so as to cause the vehicle body to tilt relative to its upright state toward the left or the right. The motor controller controls the assist force applied by the motor in response to a detection result indicating that the electric motor-assisted bicycle is traveling through a sharp curve. Thus, to allow an adjustment of the assist force to be effective during traveling along such a sharp curve, it is possible to perform a motor control suitable for traveling through a curve. This improves the assist feeling during traveling through a curve.

The sharp-curve-traveling detector may detect that the electric motor-assisted bicycle is traveling along a sharp curve when the vehicle body is tilted by a predetermined angle or greater relative to the upright state in the direction of the turn, i.e., toward the left or the right. The predetermined angle is the minimum tilt angle during sharp-curve traveling that will allow motor control customized for a curve to be effective. That is, the predetermined angle is a tilt angle that is referred to determine whether the electric motor-assisted bicycle is traveling along a sharp curve for the purpose of determining whether or not to provide assist-force control. Although not limiting, the predetermined angle may be at least about 10 degrees, for example. The predetermined angle may be changed depending on the vehicle speed of the electric motor-assisted bicycle. The information from the vehicle body motion sensor used to detect that the bicycle is traveling along a sharp curve with the vehicle body tilted by a predetermined angle or greater to the left or the right may be, for example, a physical quantity relating to one of the yaw angle, roll angle, or pitch angle of the vehicle body. For example, although the sharp-curve-traveling detector may use the roll angle or roll angular velocity acquired by the angular velocity sensor to detect that the bicycle is traveling along a sharp curve with the vehicle body tilted by a predetermined angle or greater relative to the upright state, the detection is not limited to such an implementation. The detection does not necessarily use a physical quantity relating to roll angle.

The upright state means that the top-bottom direction of the vehicle body (i.e., vehicle body frame) of an electric motor-assisted bicycle corresponds to the direction of gravity. The vehicle body being tilted to the left or the right relative to the upright state means that the axis of the vehicle body in the top-bottom direction is tilted toward the left or the right from the gravity direction.

The motor controller is able to perform a control of the assist force customized for a sharp curve, i.e., control the assist force for a sharp curve when the sharp-curve detector has detected sharp-curve traveling. For example, if the sharp-curve detector detects sharp-curve traveling, the motor controller may perform a different (modified) motor control from that performed if the sharp-curve detector does not detect sharp-curve traveling. Implementations where different motor control is used include, for example, an implementation where the assist force that depends on pedal force is determined in a different manner. In such implementations, the assist force that depends on the pedal force is controlled in different manners depending on whether sharp-curve traveling has been detected or not. It will be understood that there may be cases where the assist force that depends on the pedal force is controlled in the same manner when sharp-curve traveling has been detected and when sharp-curve traveling has not been detected.

Modifications in the control of the assist force that depends on the pedal force include, for example, modifications in the waveform of the assist force that depends on the pedal force, modifications in the magnitude of the assist force relative to the pedal force (i.e., assist ratio), modifications in the responsiveness of changes in the assist force to changes in the pedal force, modifications in assist mode, modifications in the maximum assist force, and modifications in other assist conditions.

The vehicle body motion sensor may be a sensor to detect at least two of the yaw angular velocity, pitch angular velocity, and roll angular velocity of the vehicle body of the electric motor-assisted bicycle, and/or at least two of the acceleration in the front-rear direction of the vehicle body, the acceleration in the left-right direction, and the acceleration in the top-bottom direction. The vehicle body motion sensor may include an angular velocity sensor to detect at least two of the yaw angular velocity, pitch angular velocity, and roll angular velocity of the vehicle body, or an acceleration sensor to detect at least two of the acceleration in the front-rear direction of the vehicle body, the acceleration in the left-right direction, and the acceleration in the top-bottom direction. Alternatively, the vehicle body motion sensor may include both an angular velocity sensor and an acceleration sensor.

The sharp-curve-traveling detector may detect that the electric motor-assisted bicycle is traveling along a sharp curve in a tilted state in which the vehicle body is tilted to the left or the right relative to the upright state with an increase of a pitch angular velocity in a direction representing an upward direction of a front of the vehicle body and a downward direction of a rear of the vehicle body.

The inventor discovered that motor control customized for a sharp curve is effective when the electric motor-assisted bicycle is traveling along a sharp curve with the vehicle body tilted to such a degree as to increase the pitch angular velocity in the direction representing the upward direction of the front of the vehicle body. Thus, if it has been detected that the bicycle is traveling along a sharp curve with the vehicle body tilted such that the pitch angular velocity increases, the assist force may be controlled in response to this detection to efficiently improve the assist feeling during traveling through a curve with a simple arrangement.

The sharp-curve-traveling detector may detect that the electric motor-assisted bicycle is traveling along a sharp curve in the tilted state based on at least two of (a) a yaw angle or yaw angular velocity, (b) a roll angle or roll angular velocity, or (c) a pitch angle or pitch angular velocity of the electric motor-assisted bicycle acquired by the vehicle body motion sensor. Thus, information from the vehicle body motion sensor may be used to efficiently detect sharp-curve traveling in the tilted state.

The sharp-curve-traveling detector may detect that the electric motor-assisted bicycle is traveling along a sharp curve in the tilted state if the yaw angle or yaw angular velocity of the electric motor-assisted bicycle is not lower than a first threshold, and the pitch angle or pitch angular velocity of the electric motor-assisted bicycle is not lower than a second threshold. In such implementations, it is possible to determine whether the electric motor-assisted bicycle is traveling along a curve based on the magnitude of the yaw angle or yaw angular velocity. Further, it is possible to distinguish whether the bicycle is traveling along a curve with the vehicle body is upright (i.e., in the upright state) or is traveling along a curve with the vehicle body tilted (i.e., traveling along a sharp curve) based on the pitch angle or pitch angular velocity. Thus, information from the vehicle body motion sensor may be used to detect sharp-curve traveling in the tilted state more efficiently.

At least one of the first threshold and the second threshold may change depending on a vehicle speed of the electric motor-assisted bicycle. This makes it possible to detect sharp-curve traveling in the tilted state taking account of the vehicle speed of the electric motor-assisted bicycle. In such implementations, the electric motor-assisted bicycle may include a vehicle speed sensor to detect the velocity of the electric motor-assisted bicycle in the forward direction (i.e., front-rear direction of the vehicle body).

The motor controller may modify the control of the assist force when it has been detected that the electric motor-assisted bicycle is traveling along a sharp curve in the tilted state. Thus, the assist force may be changed when the electric motor-assisted bicycle is traveling along a sharp curve with the vehicle body tilted to improve the assist feeling during traveling through a curve. For example, the motor controller may operate in such a way that control of the assist force differs between when it has been detected that the electric motor-assisted bicycle is traveling along a sharp curve in the tilted state and when it has not been detected that the electric motor-assisted bicycle is traveling along a sharp curve.

The motor controller may control the motor such that the assist force corresponding to a certain amount of the pedal force is smaller when it has been detected that the electric motor-assisted bicycle is traveling along a sharp curve in the tilted state than when it has not been detected that the electric motor-assisted bicycle is traveling along a sharp curve. This reduces the assistance during sharp-curve traveling in the tilted state. For example, this avoids making the rider feel as if the travel line has swung outwardly with respect to a turn caused by a level of assistance that feels somewhat strong during sharp-curve traveling in the tilted state.

The sharp-curve-traveling detector may detect initiation and termination of traveling of the electric motor-assisted bicycle along a sharp curve in the tilted state. In such implementations, the motor controller may perform a different control of the assist force that depends on the pedal force during a period of time that is based on at least one of the initiation and termination of traveling of the electric motor-assisted bicycle along a sharp curve in the tilted state. This enables control of the assist force suitable for a sharp curve at the appropriate timing. This efficiently improves the assist feeling during traveling through a curve.

The motor controller may perform a different control of the assist force in a predetermined period of time after the termination of traveling along a shape curve in the tilted state of the electric motor-assisted bicycle. Thus, after the termination of sharp-curve traveling in the tilted state, control of the assist force customized for sharp-curve traveling is able to be performed for a certain period of time. This improves the assist feeling directly after the sharp curve.

A motor control apparatus for controlling a motor that generates an assist force to be added, as assistance, to a pedal force on a pedal of an electric motor-assisted bicycle is also encompassed by the preferred embodiments of the present invention. The motor control apparatus may include a motor controller configured or programmed to control the assist force applied by the motor depending on the pedal force, the pedal force being detected by a torque sensor to detect the pedal force on the pedal; and a sharp-curve-traveling detector to detect that the electric motor-assisted bicycle is traveling along a sharp curve in a tilted state in which the vehicle body is tilted to a left or right relative to an upright state, based on information acquired by an angular velocity sensor to detect at least two of a yaw angular velocity, a pitch angular velocity, and a roll angular velocity of the electric motor-assisted bicycle. The motor controller controls the assist force depending on a detection result from the sharp-curve-traveling detector.

Now, electric motor-assisted bicycles according to preferred embodiments of the present invention will be described with reference to the drawings. In the drawings, the same or corresponding elements are labeled with the same reference numerals, and their description will not be repeated. Further, the sizes of the components in the drawings do not exactly represent the sizes of the actual components, the size ratios between the components, or the like. In the description provided below, the directions "front/forward" and "rear(ward)", "left" and "right", and "top/up(ward)" and "bottom/down(ward)" of the electric motor-assisted bicycle refer to such directions as perceived by a rider sitting on the saddle (i.e., seat 24) and gripping the handlebars 23. The directions "front/forward" and "rear(ward)", "left" and "right", and "top/up(ward)" and "bottom/down(ward)" of the electric motor-assisted bicycle are the same as such directions of the vehicle body and vehicle body frame of the electric motor-assisted bicycle. Furthermore, the forward direction of the electric motor-assisted bicycle is the same as the front-rear direction of the electric motor-assisted bicycle. The preferred embodiments described below are merely exemplary, and the present invention is not limited to the preferred embodiments described below.

FIG. 1 is a left side view of an electric motor-assisted bicycle 10 according to a preferred embodiment of the present invention. The characters F, B, U, and D in FIG. 1 indicate forward, rearward, upward and downward, respectively.

As shown in FIG. 1, the electric motor-assisted bicycle 10 includes a vehicle body frame 11. The vehicle body frame 11 extends in the front-rear direction. The vehicle body frame 11 includes a head pipe 12, an upper frame portion 13*u*, a down frame portion 13*d*, a seat frame portion 14, a pair of chain stays 16, and a pair of seat stays 17. The head pipe 12 is located toward the front with respect to the electric motor-assisted bicycle 10. The front ends of the down and upper frame portions 13*d* and 13*u* are connected to the head pipe 12. The down and upper frame portions 13*d* and 13*u* extend in the front-rear direction. The down and upper frame portions 13*d* and 13*u* extend obliquely downward. The upper frame portion 13*u* is located higher than the down frame portion 13*d*. The rear end of the upper frame portion 13*u* is connected to the seat frame portion 14. The rear end of the down frame portion 13*d* is connected to a bracket 15. The lower end of the seat frame portion 14 is connected to the bracket 15. The seat frame portion 14 extends upward and obliquely rearward from the bracket 15. It will be understood that the vehicle body frame 11 may not include an upper frame portion 13*u*.

A handle stem (i.e., steering column) 25 is inserted into the head pipe 12 so as to be rotatable. The handlebars 23 are fixed to the upper end of the handle stem 25. A front fork 26 is fixed to the lower end of the handle stem 25. A front wheel 21 is rotatably supported on the lower end of the front fork 26 by an axle 27.

A grip is attached to each of the left and right ends of the handlebars 23. A left brake lever 74 is attached to a location on the handlebars 23 toward the left, whereas a right brake lever 74 is attached to a location on the handlebars 23 toward the right. The left brake lever 74 operates a brake 76 for the rear wheel 22. The right brake lever 74 operates a brake 75 for the front wheel 21.

A seat pipe 28 is inserted into the cylindrical seat frame portion 14. A seat 24 is provided on the upper end of the seat pipe 28. Thus, the vehicle body frame 11 rotatably supports the handle stem 25 at its front, and rotatably supports the rear wheel 22 at its rear. Further, the seat 24 and a drive unit 40 are attached to the vehicle body frame 11.

The pair of chain stays 16 are connected to the rear end of the bracket 15. The pair of chain stays 16 are positioned to sandwich the rear wheel 22 from the left and right. One end of each of the seat stays 17 is connected to the rear end of the associated one of the chain stays 16. The pair of seat stays 17 are positioned to sandwich the rear wheel 22 from the left and right. The other end of each of the seat stays 17 is connected to a location on the seat frame portion 14 toward its top. The rear wheel 22 is rotatably supported on the rear ends of the chain stays 16 by means of the axle 29.

A vehicle speed sensor (i.e., speed sensor) 61 to detect rotation of the front wheel 21 is provided on the front fork 26. The vehicle speed sensor 61 includes, for example, a detected element that rotates together with the front wheel 21, and a detecting element fixed to the vehicle body frame 11 to detect rotation of the detected element. The detecting element detects the detected element in a mechanical, magnetic, or optical manner. The vehicle speed sensor 61 may detect rotation of a rotating body other than the front wheel 21 that rotates as the electric motor-assisted bicycle 10 moves forward, such as the rear wheel 22, motor 3, crankshaft 41, transmission gear, or chain.

A vehicle body motion sensor 63 is attached to the vehicle body frame 11. The vehicle body motion sensor 63 may be, for example, an angular velocity sensor (e.g., gyro sensor) to detect the angular velocity of the vehicle body frame 11 (i.e., the vehicle body). Alternatively, the vehicle body motion sensor 63 may be an acceleration sensor to detect the acceleration of the vehicle body frame 11 (i.e., the vehicle body).

Alternatively, the vehicle body motion sensor 63 may be a 6-axis sensor including an angular velocity sensor and an acceleration sensor. The vehicle body motion sensor 63 is fixed to the vehicle body frame 11. The location on which the vehicle body motion sensor 63 is attached is not limited to the down frame portion 13*d*. For example, the vehicle body motion sensor 63 may be attached to another frame portion, such as the upper frame portion 13*u*, bracket 15, or drive unit 40.

The drive unit 40 is attached to the lower edge of the bracket 15 by fasteners (not shown). The drive unit 40 includes a housing 51 defining the exterior of the drive unit 40. A motor 3 is contained in the housing 51. A crankshaft 41 extends through the housing 51 in the left-right direction. The crankshaft 41 is rotatably supported on the housing 51 by a plurality of bearings.

A torque sensor 62 is provided around the crankshaft 41 to detect a pedal force applied by the rider. The torque sensor 62 detects torque that rotates the crankshaft 41 about its axis. The torque sensor 62 may be, for example, a non-contact torque sensor such as a magnetostrictive one, or a contact torque sensor such as an elastic-body variable detection-type one. A magnetostrictive torque sensor includes a magnetostrictive member that produces magnetostrictive effects and receives a rotational force of the crankshaft, and a detection coil to detect a change in magnetic permeability caused by a force from the magnetostrictive member.

Crank arms 31 are attached to the respective ends of the crankshaft 41. Pedals 33 are attached to the distal ends of the respective crank arms 31. The crankshaft 41 is rotated by the rider pressing the pedals 33. Although not shown, the electric motor-assisted bicycle 10 is provided with a driving sprocket that rotates together with the crankshaft 41 and a driven sprocket that rotates together with the rear wheel 22. A chain 46 is wound around the driving and driven sprockets to connect them. It will be understood that the chain 46 may be replaced by a belt, a shaft or the like. A one-way clutch 49 (see FIG. 2) is provided in the path of transmission of rotation from the driven sprocket to the rear wheel 22. The one-way clutch 49 transmits forward rotation, and does not transmit rearward rotation (i.e., reverse rotation).

A transmission mechanism (not shown) is provided within the drive unit 40 to transmit the rotation of the motor 3 to the driving sprocket (or chain 46). The transmission mechanism includes, for example, a decelerator (i.e., reduction gears) 42 (see FIG. 2). The decelerator 42 reduces the rotational speed of the motor before transmission to the driving sprocket. Further, the transmission mechanism includes a synthesizing mechanism that synthesizes the rotation of the crankshaft 41 and the rotation of the motor 3 before transmission to the driving sprocket. The synthesizing mechanism includes a cylindrical member, for example. The crankshaft 41 is located within the cylindrical member. The driving sprocket is attached to the synthesizing mechanism. The synthesizing mechanism rotates about the same axis of rotation as the crankshaft 41 and driving sprocket. One-way clutches 43 and 44 (see FIG. 2) may be provided in the path of transmission of rotation from the crankshaft 41 to the synthesizing mechanism and the path of transmission of rotation from the motor 3 to the synthesizing mechanism. The rotational force transmitted from the motor 3 to the driving sprocket via the transmission mechanism is the assist force applied by the motor 3.

A battery unit 35 is positioned on the down frame portion 13*d*. The battery unit 35 supplies the motor 3 of the drive unit 40 with electric power. The battery unit 35 includes a battery and a battery control unit, not shown. The battery is a chargeable battery able to be charged and discharged. The battery control unit controls the charging and discharging of the battery and, at the same time, monitors output current, remaining capacity, and other information about the battery. It will be understood that the battery unit 35 may be positioned on the seat frame portion 14 or upper frame portion 13*u*.

The handlebars 23 are provided with a display device 37. The display device 37 includes, for example, a display and buttons to receive rider operations, or an input unit such as a touch screen. The display device 37 displays various information relating to the electric motor-assisted bicycle 10. It will be understood that the display device 37 may be omitted.

Figure 2:
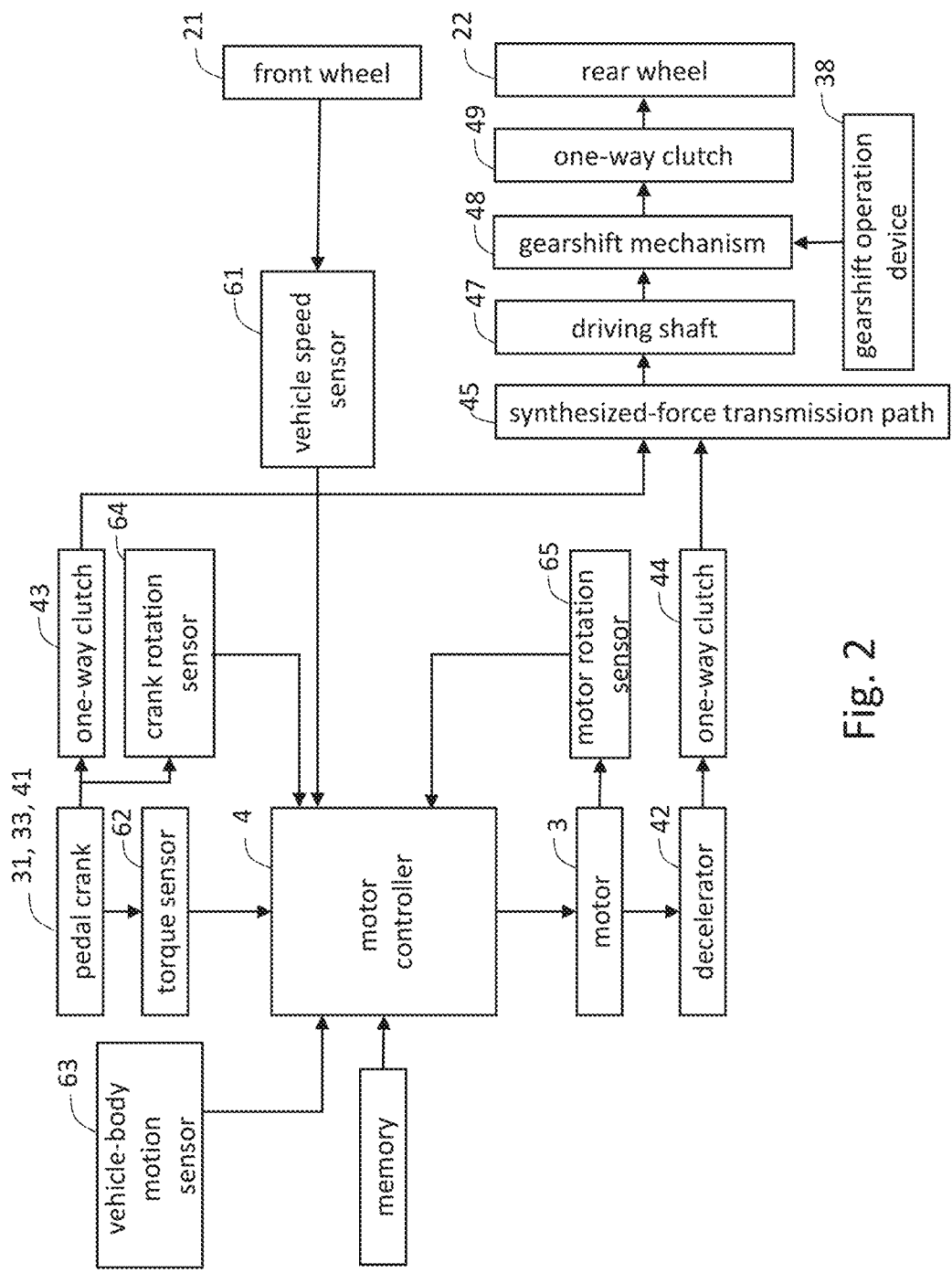
FIG. 2 is a block diagram of an exemplary configuration of the electric motor-assisted bicycle shown in FIG. 1.

FIG. 2 is a block diagram of an exemplary mechanical and electrical connection configuration of the components of the electric motor-assisted bicycle 10 shown in FIG. 1. In the implementation shown in FIG. 2, rotation of the pedal crank (including the pedals 33, crank arms 31, and crankshaft 41) is transmitted to a path of transmission of synthesized driving force 45 via the one-way clutch 43. Rotation of the motor 3 is transmitted to the synthesized-force transmission path 45 via the decelerator 42 and one-way clutches 44. The synthesized-force transmission path 45 includes the above-discussed synthesizing mechanism, driving sprocket, chain 46, and driven sprocket. Within the synthesized-force transmission path 45, a driving force is transmitted through the synthesizing mechanism, driving sprocket, chain 46, and driven sprocket in this order. Rotation of the driven sprocket is transmitted to the rear wheel 22 via a driving shaft 47, a gearshift mechanism 48, and the one-way clutch 49.

The gearshift mechanism 48 changes the gear ratio in response to an operation of a gearshift operation device 38 by the rider. The gearshift operation device 38 may be mounted on the handlebars 23 (FIG. 1), for example. In this implementation, the gearshift mechanism 48 is an internal gearshift located between the driving shaft 47 and rear wheel 22; alternatively, the gearshift mechanism 48 may be an external gearshift. If the gearshift mechanism 48 is an external gearshift, the driven sprocket may include a multi-gear sprocket. In such implementations, the multi-gear sprocket, around which the chain 46 is wound, enables switching in response to a rider operation of the gearshift operation device 38. The one-way clutch 49 transmits the rotation of the gearshift mechanism 48 to the rear wheel 22 only when the rotational speed of the output shaft of the gearshift mechanism 48 is higher than the rotational speed of the rear wheel 22. When the rotational speed of the output shaft of the gearshift mechanism 48 is lower than the rotational speed of the rear wheel 22, the one-way clutch 49 does not transmit the rotation of the gearshift mechanism 48 to the rear wheel 22. It will be understood that the gearshift mechanism 48 and gearshift operation device 38 may be omitted.

The pedal force generated by the rider pressing the pedals 33 rotates the driving sprocket in the forward direction, and is transmitted, via the chain 46, as a driving force that rotates the rear wheel 22 in the forward direction. Further, the rotational force generated by operation of the motor 3 rotates the crankshaft 41 in the forward direction. Thus, the rotational force output by the motor 3 is added, as assistance, to the pedal force generated by the rider pressing the pedals 33.

The electric motor-assisted bicycle 10 includes a motor control apparatus 4 to control the motor 3. For example, an electronic device mounted on a board within the housing 51 of the drive unit 40 may define the motor control apparatus 4. The electronic device includes, for example, a processor or an electronic circuit. The motor control apparatus 4 is electrically connected to, at least, the torque sensor 62, vehicle body motion sensor 63, and motor 3. In the implementation shown in FIG. 2, the motor control apparatus 4 is connected to a crank rotation sensor 64, a motor rotation sensor 65, and a vehicle speed sensor 61. These connections may use cables, or may be wireless.

The crank rotation sensor 64 detects rotation of the crankshaft 41. The crank rotation sensor 64 may include, for example, a detected element that rotates together with the crankshaft 41, and a detecting element fixed to the vehicle body frame 11 to detect rotation of the detected element. The detecting element able to detect the detected element in a mechanical, optical, or magnetic manner.

The motor rotation sensor 65 detects rotation of the motor 3. The motor rotation sensor 65 may detect rotation of the rotor of the motor 3, or may detect rotation based on electric current, voltage or other electrical signals relating to the motor 3.

The transmission of the assist force generated by the motor 3 is not limited to the above-described mechanism. For example, the drive unit 40 may include an output shaft that extends outwardly from within the housing 51 in the left-right direction. In such implementations, the rotation of the motor 3 is transmitted to the output shaft via the transmission mechanism. Outside the housing 51, an auxiliary sprocket is attached to the output shaft. The chain 46 is wound around the auxiliary sprocket. The rotational force generated by operation of the motor 3 rotates the auxiliary sprocket and, via the chain 46, rotates the rear wheel 22 in the forward direction.

Figure 3:
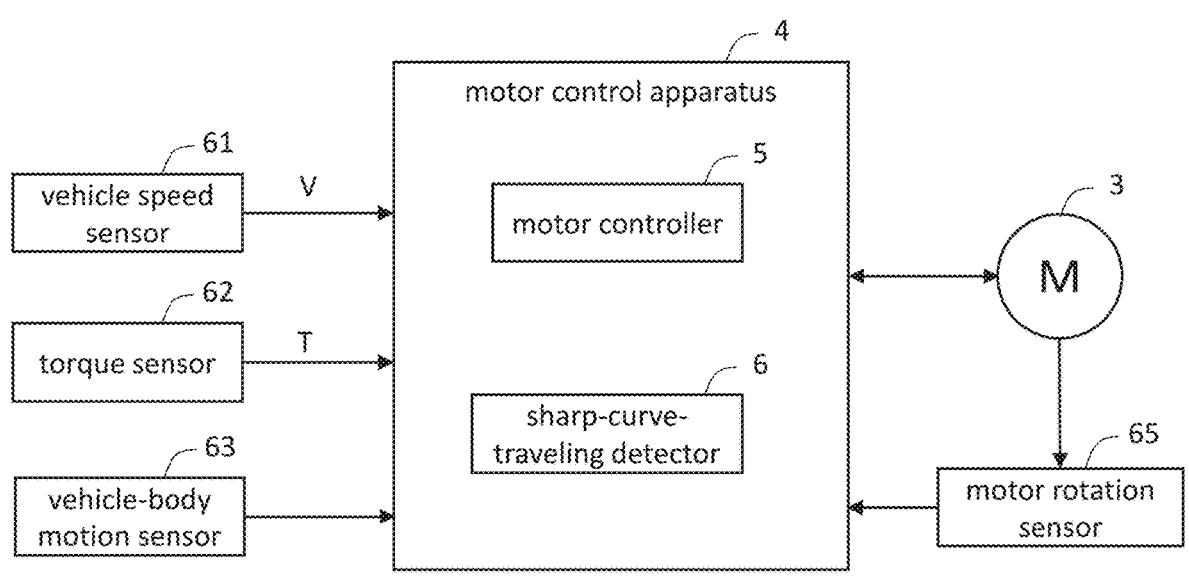
FIG. 3 shows an exemplary configuration of a motor control apparatus according to a preferred embodiment of the present invention.

FIG. 3 shows an exemplary configuration of the motor control apparatus 4. In the implementation shown in FIG. 3, the motor control apparatus 4 includes a motor controller (i.e., motor control unit) 5 and a sharp-curve-traveling detector 6. The motor controller 5 controls the assist force applied by the motor 3 depending on, at least, the pedal force T detected by the torque sensor 62. The sharp-curve-traveling detector 6 detects that the electric motor-assisted bicycle 10 is traveling along a sharp curve with the vehicle body tilted by a predetermined angle or greater relative to the upright state based on information acquired by the vehicle body motion sensor 63.

By way of example, the motor control apparatus 4 may be a motor control unit (MCU). The motor control apparatus 4 includes, for example, a processor, memory, a motor drive circuit, and a motor monitoring unit. The processor executes a program in the memory to implement the functions of the motor controller 5 and sharp-curve-traveling detector 6. It will be understood that at least some of the functions of the motor controller 5 and the sharp-curve-traveling detector 6 may be implemented by a circuit other than a processor.

To implement the functions of the motor controller 5, the processor receives input about a pedal force T and outputs control signals for the motor 3. The motor drive circuit operates in accordance with the control signals to drive the motor 3. The motor drive circuit may be an inverter, for example. The battery unit 35 supplies the motor 3 with an amount of electric power that corresponds to a control signal from the processor. The motor 3, when supplied with electric power, rotates and generates an output assist force as controlled by the motor controller 5.

The motor monitoring unit acquires values relating to the drive of the motor 3, such as electric current, voltage, number of rotations, and rotational speed of the motor 3. The processor or motor drive circuit may use values acquired by the motor monitoring unit to execute a process or operation. The motor monitoring unit is able to receive, from the motor rotation sensor 65, values representing the rotation of the motor, such as number of rotations and rotational speed of the motor 3.

The vehicle speed sensor 61 detects the rotational angle of the front wheel 21 (or another rotating body) and provides, as an output, a signal corresponding to the rotational angle to the motor control apparatus 4. For example, the vehicle speed sensor 61 detects rotation of the front wheel 21 at intervals of a predetermined angle and outputs a rectangular wave signal or a sine wave signal. The processor calculates the rotational speed of the front wheel 21 from the output signal of the vehicle speed sensor 61. In some implementations, the calculation of the rotational speed may be performed by the vehicle speed sensor 61.

The torque sensor 62 outputs a voltage signal with an amplitude corresponding to the magnitude of torque detected. The torque sensor 62 may include a torque calculation circuit that converts a voltage signal to a torque value. The torque calculation circuit may convert a generated analog voltage signal to a digital value through AD conversion, for example. The magnitude of torque detected is output as a digital signal. In some implementations, the motor control apparatus 4 may receive an analog signal from the torque sensor 62 and convert it to a digital value.

The vehicle body motion sensor 63 provides, as an output, values or signals indicating a change in the attitude of the vehicle body (i.e., vehicle body frame). The vehicle body motion sensor 63 outputs, for example, the angles or angular velocities relating to at least two of the yaw angle, roll angle, and pitch angle of the vehicle body. If the vehicle body motion sensor 63 is a 6-axis sensor, the vehicle body motion sensor 63 outputs the yaw angular velocity, roll angular velocity, and pitch angular velocity of the vehicle body, as well as the acceleration of the vehicle body in the front-rear direction, the acceleration in the left-right direction, and the acceleration in the top-bottom direction. The vehicle body motion sensor 63 may include a circuit that calculates, from electric signals derived from the detection, the yaw angular velocity, roll angular velocity, and pitch angular velocity or the associated angles. Alternatively, the motor control apparatus 4 may receive values or signals from the vehicle body motion sensor 63 and convert them to a yaw angular velocity, a roll angular velocity, and a pitch angular velocity or the associated angles.

Figure 4:
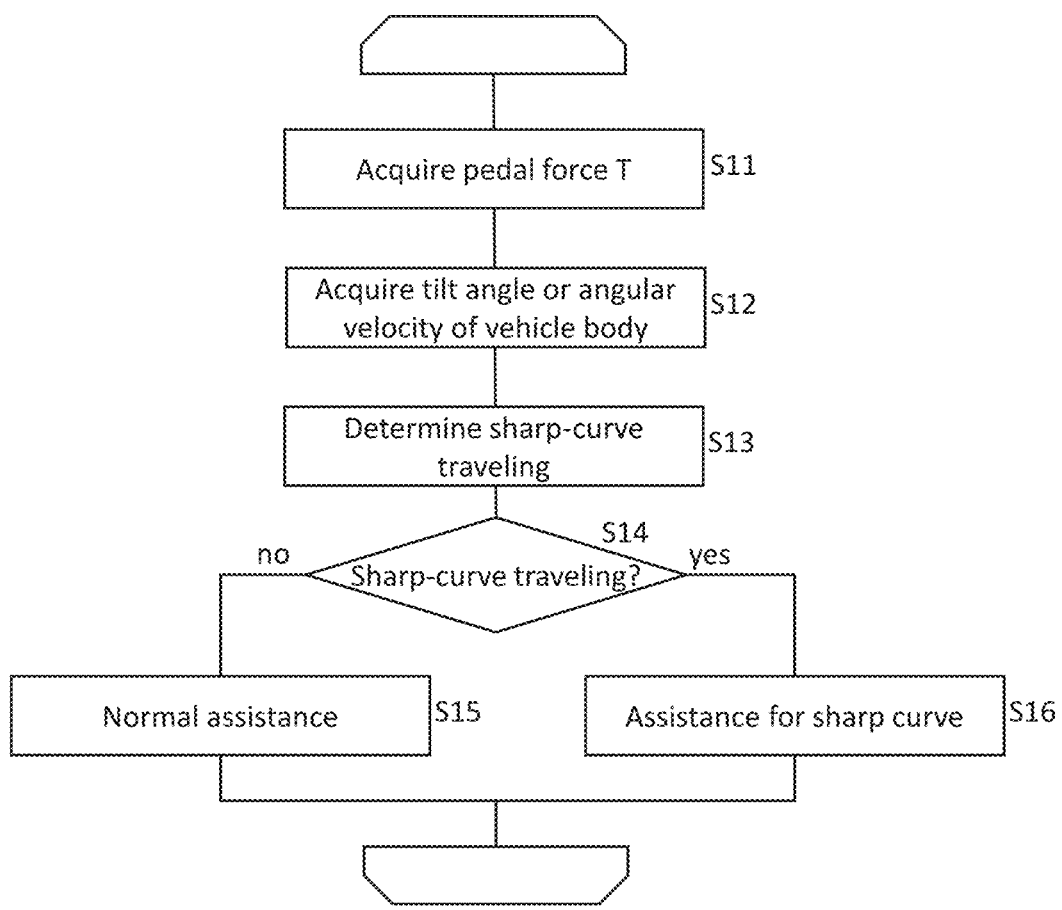
FIG. 4 is a flow chart illustrating an exemplary operation of the motor control apparatus shown in FIG. 3.

FIG. 4 is a flow chart indicating an exemplary operation of the motor control apparatus 4 shown in FIG. 3. The motor control apparatus 4 is able to repeatedly execute the process shown in FIG. 4 in a periodic manner. In FIG. 4, the motor control apparatus 4 acquires the pedal force T derived from detection by the torque sensor 62 (S11). The motor control apparatus 4 acquires the tilt angle of the vehicle body or the associated angular velocity derived from detection by the vehicle body motion sensor 63 (S12).

The sharp-curve-traveling detector 6 uses the tilt angle of the vehicle body or the associated angular velocity acquired at step S12 to determine whether the electric motor-assisted bicycle 10 is traveling along a sharp curve in a tilted state in which the vehicle body is tilted by a predetermined angle or greater to the left or the right relative to the upright state (S13). In other words, the sharp-curve-traveling detector 6 detects that the electric motor-assisted bicycle 10 is turning at a sharp curve and the vehicle body is tilted by a predetermined angle or greater to the left or the right relative to the upright state during the turn. The determination at step S13 uses at least two of (a) the yaw angle or yaw angular velocity, (b) the roll angle or roll angular velocity, and (c) the pitch angle or pitch angular velocity, acquired by the vehicle body motion sensor 63.

The sharp-curve-traveling detector 6 may make the determination at step S13 based on, for example, two angles or angular velocities relating to yaw, roll, and/or pitch. That is, the determination at step S13 may be based on the angles or angular velocities relating to one of the combinations yaw & roll, roll & pitch, or yaw & pitch. The two values in the combination may be angle & angle, angular velocity & angular velocity, or angle & angular velocity.

If it is determined at step S13 that the bicycle is traveling along a sharp curve with the vehicle body tilted by a predetermined angle or greater to the left or the right (yes at S14), the motor controller 5 controls the motor 3 to generate an assist force corresponding to a pedal force T that has been adjusted to address the sharp-curve traveling. If it is determined that the bicycle is not traveling along a shape curve with the vehicle body tilted by a predetermined angle or greater to the left or the right (no at S14), the motor controller 5 controls the motor 3 to generate an assist force corresponding to a pedal force T that has not been adjusted to address the sharp-curve traveling, i.e., a normal assist force.

At step S13, the sharp-curve-traveling detector 6 may determine whether the bicycle is traveling along such a sharp curve as to allow an adjustment of the assist force to be effective in improving the assist feeling. If the sharp-curve-traveling detector 6 has detected sharp-curve traveling, the motor controller 5 is able to adjust the assist force applied by the motor 3 to address the sharp curve. Thus, adjusting the assist force to address the sharp curve improves the assist feeling experienced by the rider during a curve.

Figure 5:
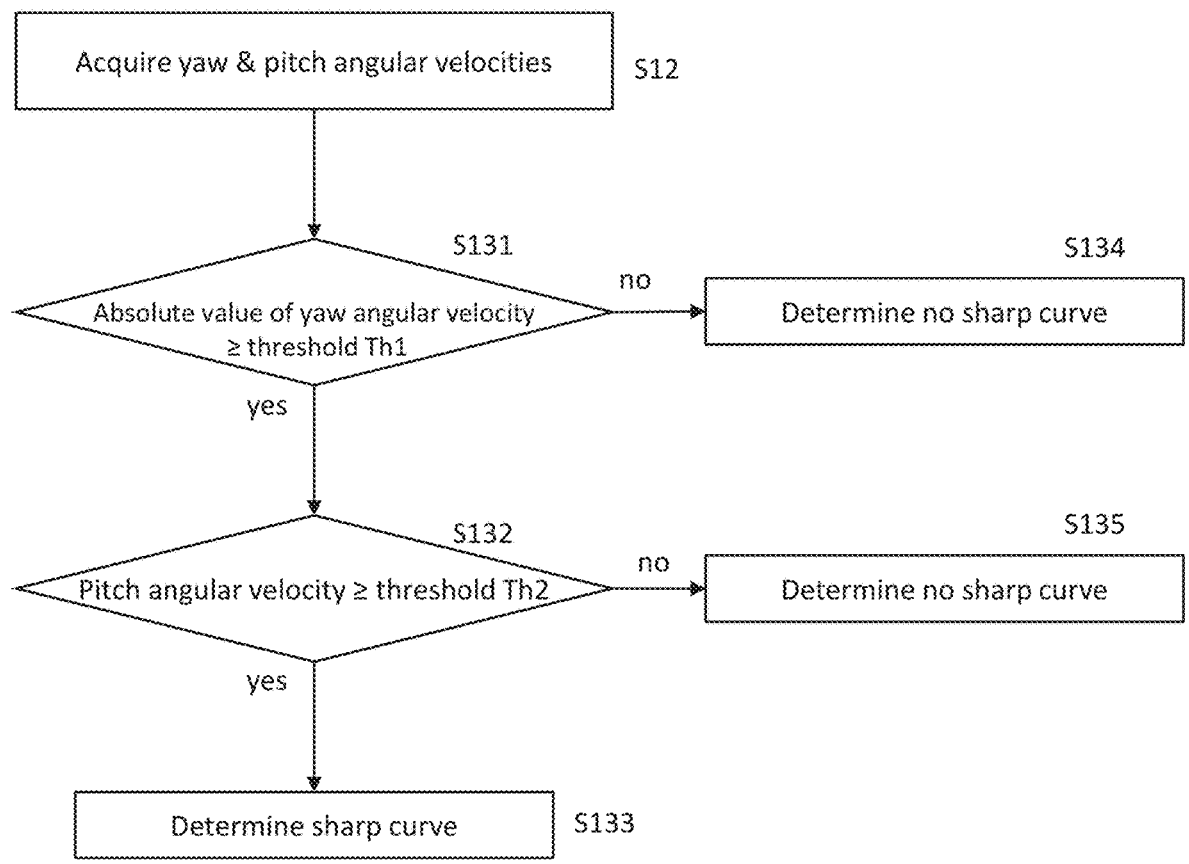
FIG. 5 is a flow chart illustrating an exemplary process during steps S12 and S13 of FIG. 4.

FIG. 5 is a flow chart illustrating an exemplary process during steps S12 and step S13 shown in FIG. 4. In the implementation shown in FIG. 5, at step S12, the motor control apparatus 4 acquires yaw angular velocity and pitch angular velocity from the vehicle body motion sensor 63. If the absolute value of yaw angular velocity is not smaller than a threshold Th1 (i.e., first threshold) (yes at S131), and the pitch angular velocity is not smaller than a threshold Th2 (i.e., second threshold) (yes at S132), then the sharp-curve-traveling detector 6 determines that the electric motor-assisted bicycle 10 is traveling along a sharp curve with the vehicle body tilted by a predetermined angle or greater to the left or the right (S133). If the absolute value of yaw angular velocity is smaller than the threshold Th1 (no at S131) or the pitch angular velocity is smaller than the threshold Th2 (no at S132), the unit determines that the electric motor-assisted bicycle 10 is not traveling along a sharp curve with the vehicle body tilted by a predetermined angle or greater to the left or the right (S134, S135).

In the implementation of FIG. 5, the determination at step S13 is based on yaw angular velocity and pitch angular velocity. If a combination of yaw and pitch is used, it is able to be determined based on yaw angular velocity (or angle) whether the bicycle is traveling along a curve, and, based on pitch angular velocity (or angle), whether the vehicle body is tilted. The inventor discovered that pitch angle changes in a characteristic manner when the electric motor-assisted bicycle is traveling along a curve with the vehicle body tilted to a certain degree in the roll direction relative to the upright state. Thus, the use of pitch angle velocity or pitch angle enables efficient and correct detection that the electric motor-assisted bicycle is traveling along a sharp curve with the vehicle body tilted by a predetermined angle or greater to the left or the right.

If yaw and pitch are used for the determination, the determination of traveling through a curve may be based on yaw angle or yaw angular velocity, and the determination of whether the bicycle is traveling along a sharp curve with the vehicle body tilted by a predetermined angle or greater to the left or the right may be based on pitch angle or pitch angular velocity. If yaw and roll are used for the determination, the determination of traveling through a curve may be based on yaw angle or yaw angular velocity, and the determination of whether the bicycle is traveling along a sharp curve with the vehicle body tilted by a predetermined angle or greater to the left or the right may be based on roll angle or roll angular velocity. If pitch and roll are used for the determination, the determination of traveling through a curve may be based on changes in roll angle or roll angular velocity, and the determination of whether the bicycle is traveling along a sharp curve with the vehicle body tilted may be based on pitch angle or pitch angular velocity.

Figure 6:
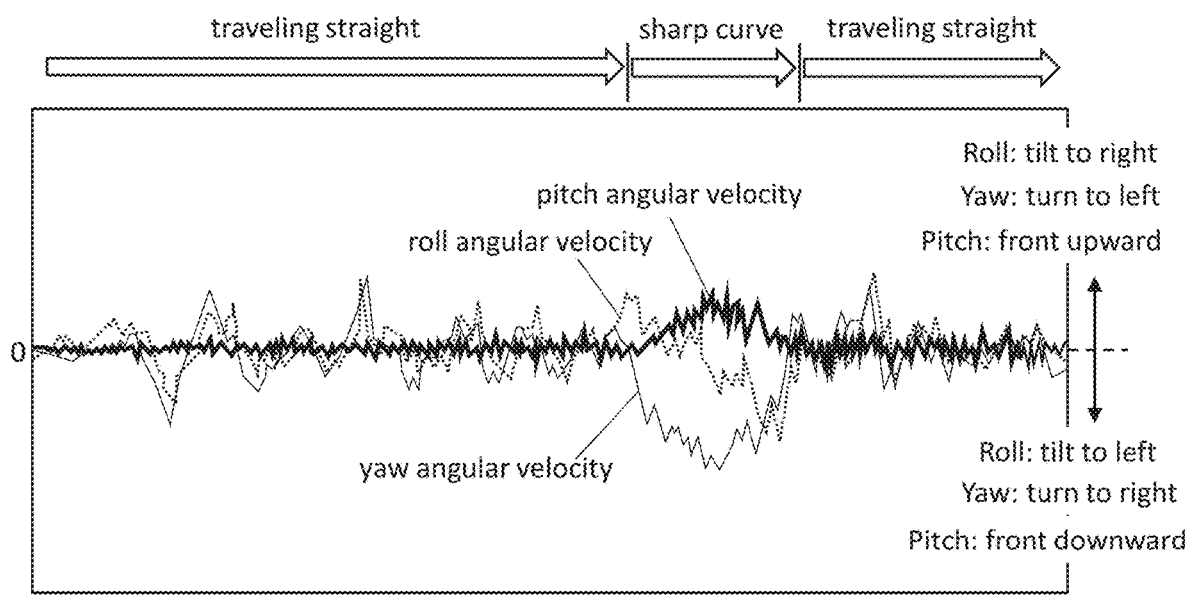
FIG. 6 illustrates exemplary changes over time in a yaw angular velocity, a roll angular velocity, and a pitch angular velocity of the electric motor-assisted bicycle.

FIG. 6 illustrates exemplary changes over time in the yaw angular velocity, roll angular velocity, and pitch angular velocity in a period of time including periods where the electric motor-assisted bicycle is traveling straight and a period of time where it is traveling along a sharp curve with the vehicle body tilted by a predetermined angle or greater to the left or the right. In the graph of FIG. 6, during the time of sharp-curve traveling, the absolute value, in the direction of turning, of yaw angular velocity is large. The roll angular velocity swings in the direction of turning and then returns to zero before swinging in the output direction. The pitch angular velocity increases in the direction representing the upward direction of the front of the vehicle body.

During sharp-curve traveling, pitch angular velocity tends to increase in the direction representing the upward direction of the front of the vehicle body, regardless of whether the bicycle is turning to the right or left. Based on this tendency, it is able to be determined that the electric motor-assisted bicycle is traveling along a sharp curve with the vehicle body tilted by a predetermined angle or greater to the left or the right if, for example, the yaw angular velocity (or yaw angle) is not lower than the first threshold and the pitch angular velocity (or pitch angle) is not lower than the second threshold. Thus, determination using a combination of yaw and pitch enables detection of traveling through a curve in a state that will allow an adjustment of the assist force of the motor 3 to be effective.

The roll angular velocity during sharp-curve traveling swings in the direction of turning and then swings back in the opposite direction. Based on this tendency, sharp-curve traveling with the vehicle body tilted by a predetermined angle or greater to the left or the right is detected if, for example, within a period of time where the roll angular velocity shows such a behavior, the pitch angular velocity is not lower than a threshold. Further, sharp-curve traveling with the vehicle body tilted by a predetermined angle or greater to the left or the right is detected if the yaw angular velocity (or yaw angle) is not lower than the first threshold and the roll angular velocity (or roll angle) is not lower than the third threshold.

Figure 7:
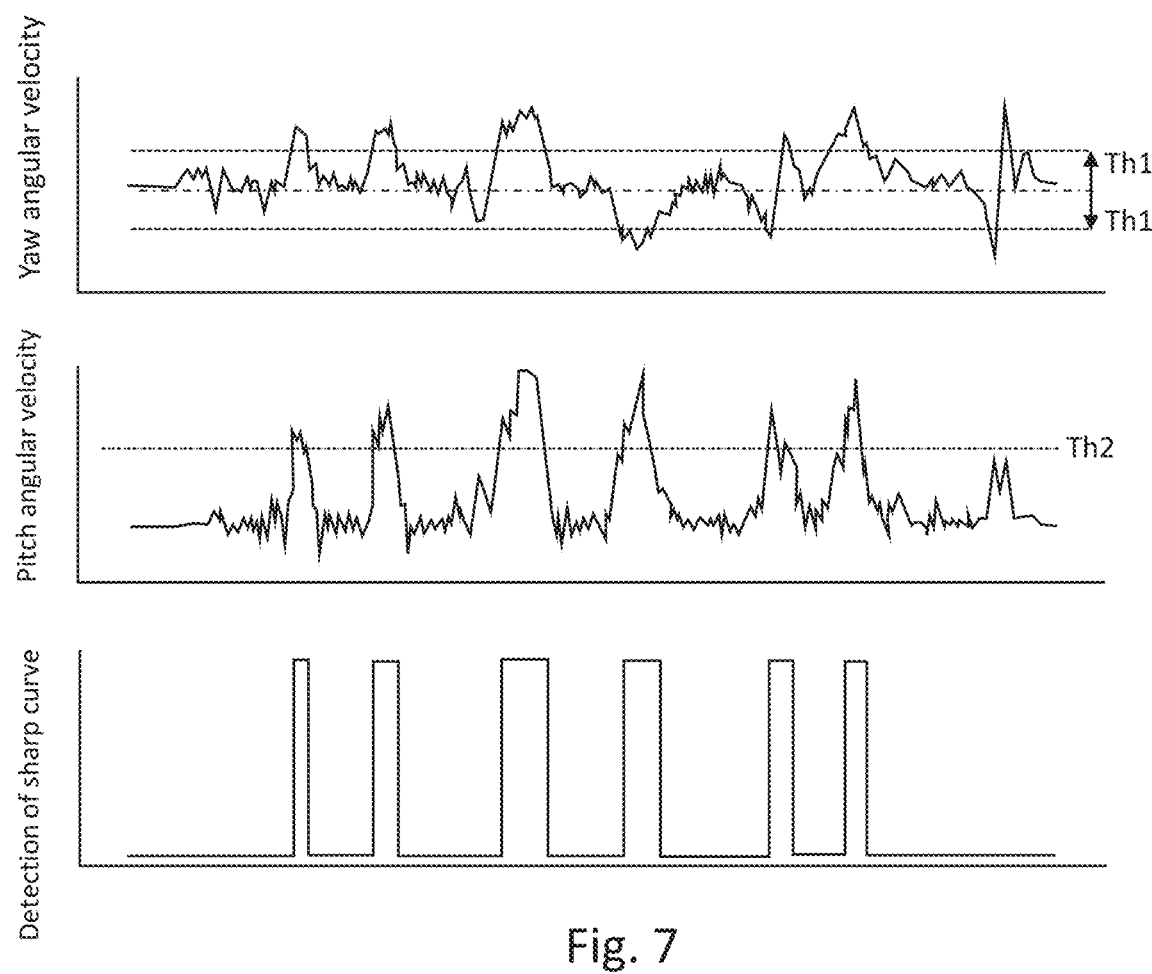
FIG. 7 is a graph illustrating exemplary changes over time in the yaw angular velocity, the pitch angular velocity, and a sharp-curve detection result.

FIG. 7 is a graph illustrating exemplary changes over time in yaw angular velocity, pitch angular velocity, and sharp-curve detection result from the sharp-curve-traveling detector 6. The graph of sharp-curve detection shows that sharp-curve traveling in a tilted state in which the vehicle body is tilted by a predetermined angle or greater to the left or the right is detected when the signal is high. In the example shown in FIG. 7, sharp-curve traveling in the tilted state is detected if the absolute value of yaw angular velocity is not smaller than the threshold Th1 and the pitch angular velocity is not lower than the threshold Th2.

Figure 8:
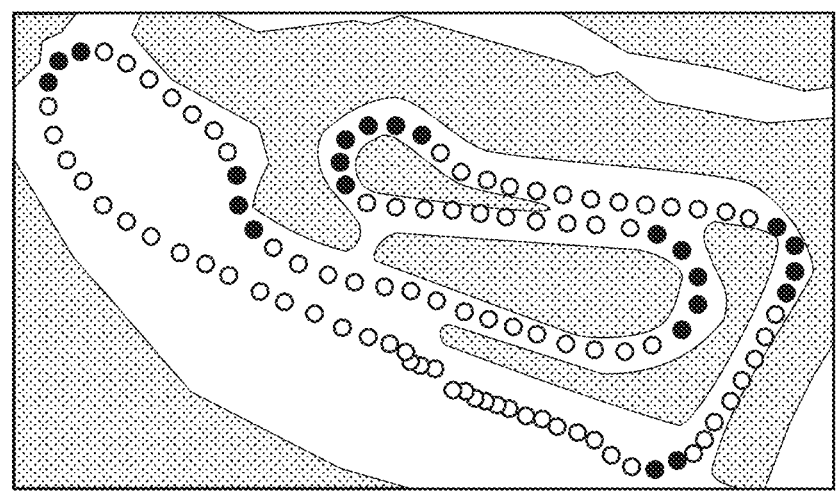
FIG. 8 is a plot tracking a route along which an electric motor-assisted bicycle has traveled.

FIG. 8 is a plot tracking the route along which the electric motor-assisted bicycle 10 has traveled. In the plotting in FIG. 8, a black circle indicates a location at which the sharp-curve-traveling detector 6 detected sharp-curve traveling in a tilted state in which the vehicle body was tilted by a predetermined angle or greater to the left or the right, and a white circle indicates a location with no such detection. Thus, the sharp-curve-traveling detector 6 detected that the electric motor-assisted bicycle 10 traveled along sharp curves in the tilted state. As shown in FIG. 8, the sharp-curve-traveling detector 6 detected sharp-curve traveling at locations at which the radius of curvature of the travel track was relatively small. If such a sharp curve in the tilted state is detected, the assist force applied by the motor 3 is controlled to address the sharp curve, for example, in the following manner.

The motor controller 5 controls the assist force applied by the motor 3 depending on the detection result from the sharp-curve-traveling detector 6. If the sharp-curve-traveling detector 6 detects that the electric motor-assisted bicycle 10 is traveling along a sharp curve with the vehicle body tilted by a predetermined angle or greater to the left or the right, i.e., in the tilted state, then the motor controller 5 adjusts the assist force applied by the motor 3 in order to address the sharp curve. For example, if the sharp-curve-traveling detector 6 detects sharp-curve traveling in the tilted state, the motor controller 5 performs a different assist-force control from when no sharp-curve traveling is detected.

By way of example, if sharp-curve traveling in the tilted state is detected, the motor controller 5 can make a modification in at least one of assist ratio, assist responsiveness, magnitude of assistance, assist output waveform, travel mode (i.e., assist mode), which are used to determine an assist force applied by the motor 3 to address the sharp curve.

An assist ratio is a ratio of the assist force applied by the motor 3 to the pedal force. An assist responsiveness is a responsiveness (i.e., an ability to follow) of the motor 3 to changes in the pedal force by changing its assist force. For example, the motor controller 5 may make a modification in assist responsiveness by making a modification in the rate at which the assist force is changed.

A magnitude of assistance may be, for example, the maximum assist force that is able to be output by the motor 3. Assist output waveform is the waveform of assist force output by the motor 3. For example, a modification may be made in the assist output waveform by making modifications in the assist ratio and the assist responsiveness.

The travel mode is a predetermined mode of assist control that sets a method of determining an assist force to control the assist force. Each travel mode defines how to determine an assist force that depends on, for example, pedal force as well as other conditions such as vehicle speed. Switching between travel modes makes a modification in the way to determine an assist force that depends on pedal force and/or other conditions. For example, the motor controller 5 may switch to a travel mode that addresses sharp-curve traveling if the sharp-curve-traveling detector 6 detects sharp-curve traveling.

Thus, when sharp-curve traveling is detected, the motor controller 5 modifies how to determine an assist force applied by the motor 3 that depends on pedal force, in order to address the sharp curve. In such implementations, modifications may be made in how to determine an assist force that depends on pedal force and, in addition, conditions including vehicle speed or crank rotation or other aspects, in order to address the sharp curve.

By way of example, when the sharp-curve-traveling detector 6 has detected sharp-curve traveling in the tilted state, the motor controller 5 may control the motor 3 such that the assist force applied by the motor 3 that depends on pedal force is smaller than when no such curve traveling is detected. For example, the inventor discovered that the rider sometimes feels strong assistance when the electric motor-assisted bicycle 10 is traveling along a sharp curve with the vehicle body tilted by a predetermined angle or greater to the left or the right. When the rider feels strong assistance at a curve, he/she sometimes feels that the travel line along the curve may somewhat deviate from his/her intended one. In such situations, the motor 3 may be controlled in such a manner that the assist force that depends on pedal force is smaller during sharp-curve traveling in the tilted state than when the bicycle is traveling straight, thus improving the assist feeling experienced by the rider.

In another example, if the sharp-curve-traveling detector 6 has detected sharp-curve traveling with the vehicle body tilted by a predetermined angle or greater to the left or the right, the motor controller 5 may control the motor such that the assist force applied by the motor 3 that depends on pedal force is larger than when no such traveling is detected. For example, during the use of a function that automatically switches the travel mode depending on pedal force, when the electric motor-assisted bicycle travels along a curve by inertia without the rider generating any pedal force, the bicycle may switch to a travel mode that provides a smaller assist force that depends on pedal force, resulting in a weak assist force. When the electric motor-assisted bicycle is traveling along a sharp curve with the vehicle body tilted by a predetermined angle or greater to the left or the right, it is often the case that no pedal force is generated. In such situations, upon detection of sharp-curve traveling with the vehicle body tilted, the motor 3 may be controlled such that the assist force that depends on pedal force is larger than when the bicycle is traveling straight, thus ensuring that there is an assist force that corresponds to the pedal force during traveling through a curve or after leaving the curve. This improves the assist feeling experienced by the rider.

The sharp-curve-traveling detector 6 may determine sharp-curve traveling based on the vehicle speed in the forward direction of the electric motor-assisted bicycle 10 detected by the vehicle speed sensor 61. For example, the sharp-curve-traveling detector 6 may refer to angles or angular velocities relating to yaw, roll, and pitch and change, depending on vehicle speed, the threshold used to determine sharp-curve traveling with the vehicle body tilted by a predetermined angle or greater to the left or the right. For example, if the yaw angle or yaw angular velocity is not lower than the first threshold and the pitch angle or pitch angular velocity is not lower than the second threshold, the sharp-curve-traveling detector 6 detects sharp-curve traveling with the vehicle body tilted by a predetermined angle or greater to the left or the right. In such implementations, at least one of the first and second thresholds may be a value that changes depending on the vehicle speed of the electric motor-assisted bicycle. Further, in implementations where sharp-curve traveling is determined based on a comparison between the roll angle or roll angular velocity with a third threshold, the third threshold may be a value that changes depending on vehicle speed. Even for the same curve radius, the tilt angle of the vehicle body to the left or the right during traveling through a curve varies if the vehicle speed differs. Thus, changing the threshold depending on vehicle speed enables detecting sharp-curve traveling considering differences in the degree of tilt that depends on vehicle speed.

For example, the threshold with which the sharp-curve-traveling detector 6 compares the angle or acceleration relating to at least one of yaw, roll, and pitch may increase as the vehicle speed increase. That is, the higher the vehicle speed, the larger the degree of tilt of the vehicle body for determining sharp-curve traveling with the vehicle body tilted by a predetermined angle or greater to the left or the right.

The sharp-curve-traveling detector 6 may detect initiation and termination of sharp-curve traveling of the electric motor-assisted bicycle 10 with the vehicle body tilted by a predetermined angle or greater to the left or the right, i.e., in the tilted state. The motor controller 5, based on at least one of the initiation and termination of sharp-curve traveling detected, may determine a period of time to perform a control of the assist force of the motor 3 when sharp-curve traveling has been detected. Thus, the motor controller 5 is able to operate in such a way that control of the assist force that depends on pedal force for a period of time that is based on at least one of the initiation and termination of sharp-curve traveling of the electric motor-assisted bicycle 10 with the vehicle body tilted by a predetermined angle or greater to the left and right is different from a control for other adjacent periods of time.

For example, the motor controller 5 may perform a control of the assist force for a sharp curve during the period of time between the initiation and termination of detection of sharp-curve traveling in the tilted state. In such implementations, control of the assist force that depends on pedal force for the period of time between the initiation and termination of detection may be different from control in other adjacent periods of time.

The motor controller 5 may continue control of assist the force for a sharp curve for a predetermined period of time even after detection of termination. In such implementations, control of the assist force that depends on pedal force for a predetermined period after detection of the termination of the sharp curve may be different. For example, for a predetermined period of time beginning at the time of detection of the termination of a sharp curve, the motor controller 5 may perform a different control of the assist force that depends on pedal force from that for other adjacent periods of time. In such implementations, the predetermined period of time may be a predetermined fixed period, or may depend on values indicating running conditions such as vehicle speed.

By way of example, the motor controller 5 may control the motor 3 such that the assist force that depends on pedal force for a predetermined period of time beginning at a time at which the sharp-curve-traveling detector 6 detected termination of a sharp curve is larger than those for preceding periods of time. Thus, the assist force that depends on pedal force after exiting the sharp curve is able to be increased. For example, at a curve, the bicycle may switch to a travel mode in which the assist force that depends on pedal force is low because the rider does not generate a pedal force. In such situations, the motor 3 may be controlled to increase the assist force that depends on pedal force for a predetermined period of time after detection of the termination of sharp-curve traveling, thus providing an assist force that corresponds to the pedal force after leaving the curve. This improves the assist feeling experienced by the rider.

In the implementation shown in FIG. 1, the crankshaft 41 extends through the drive unit 40; in other implementations, the crankshaft 41 may not extend through the drive unit 40. For example, the drive unit 40 may be located around the axle 29 of the rear wheel 22 or around the axle 27 of the front wheel 21.

In the above-described implementations, the vehicle speed sensor 61 detects rotation of a rotating body that rotates as the electric motor-assisted bicycle travels. The vehicle speed sensor 61 is not limited to such implementations. For example, the vehicle speed sensor 61 may be an acceleration sensor to detect the acceleration in the forward direction of the electric motor-assisted bicycle (i.e., front-rear direction of the vehicle body frame 11).

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electric motor-assisted bicycle comprising:
a vehicle body motion sensor to detect a change in an attitude of a vehicle body of the electric motor-assisted bicycle relative to a road surface;
a torque sensor to detect a pedal force on a pedal connected to a crankshaft of the electric motor-assisted bicycle;
a motor to generate an assist force to be added to the pedal force;
a motor controller configured or programmed to control the assist force applied by the motor depending on the pedal force; and
a sharp-curve-traveling detector to detect that the electric motor-assisted bicycle is traveling along a sharp curve in a tilted state in which the vehicle body is tilted relative to an upright state to a left or right, based on information acquired by the vehicle body motion sensor; wherein
the motor controller is configured or programmed to control the assist force depending on a detection result from the sharp-curve-traveling detector; and
the sharp-curve-traveling detector detects that the electric motor-assisted bicycle is traveling along the sharp curve in the tilted state based on an increase of a pitch angular velocity in a direction representing an upward direction of a front of the vehicle body and a downward direction of a rear of the vehicle body.

2. The electric motor-assisted bicycle according to claim 1, wherein the motor controller is configured or programmed to modify control of the assist force when the electric motor-assisted bicycle is detected as traveling along the sharp curve in the tilted state.

3. The electric motor-assisted bicycle according to claim 2, wherein the motor controller is configured or programmed to control the motor such that the assist force is smaller when the electric motor-assisted bicycle is detected as traveling along the sharp curve in the tilted state than when the electric motor-assisted bicycle is not detected as traveling along the sharp curve in the tilted state.

4. The electric motor-assisted bicycle according to claim 1, wherein the sharp-curve-traveling detector detects an initiation and a termination of traveling of the electric motor-assisted bicycle along the sharp curve in the tilted state; and
the motor controller is configured or programmed to perform a different control of the assist force during a period of time that is based on at least one of the initiation and the termination of traveling of the electric motor-assisted bicycle along the sharp curve in the tilted state.

5. The electric motor-assisted bicycle according to claim 4, wherein the motor controller is configured or programmed to perform the different control of the assist force during a predetermined period of time after the termination of traveling of the electric motor-assisted bicycle along the sharp curve in the tilted state.

6. An electric motor-assisted bicycle comprising:
a vehicle body motion sensor to detect a change in an attitude of a vehicle body of the electric motor-assisted bicycle relative to a road surface;
a torque sensor to detect a pedal force on a pedal connected to a crankshaft of the electric motor-assisted bicycle;
a motor to generate an assist force to be added to the pedal force;
a motor controller configured or programmed to control the assist force applied by the motor depending on the pedal force; and
a sharp-curve-traveling detector to detect that the electric motor-assisted bicycle is traveling along a sharp curve in a tilted state in which the vehicle body is tilted relative to an upright state to a left or right, based on information acquired by the vehicle body motion sensor; wherein
the motor controller is configured or programmed to control the assist force depending on a detection result from the sharp-curve-traveling detector; and
the sharp-curve-traveling detector detects that the electric motor-assisted bicycle is traveling along the sharp curve in the tilted state based on a combination of (a) a yaw angle or a yaw angular velocity of the electric motor-assisted bicycle and (b) a pitch angle or a pitch angular velocity of the electric motor-assisted bicycle, or a combination of (c) a roll angle or a roll angular velocity of the electric motor-assisted bicycle and (b) the pitch angle or the pitch angular velocity of the electric motor-assisted bicycle acquired by the vehicle body motion sensor.

7. The electric motor-assisted bicycle according to claim 6, wherein the motor controller is configured or programmed to modify control of the assist force when the electric motor-assisted bicycle is detected as traveling along the sharp curve in the tilted state.

8. The electric motor-assisted bicycle according to claim 7, wherein the motor controller is configured or programmed to control the motor such that the assist force is smaller when the electric motor-assisted bicycle is detected as traveling along the sharp curve in the tilted state than when the electric motor-assisted bicycle is not detected as traveling along the sharp curve in the tilted state.

9. The electric motor-assisted bicycle according to claim 6, wherein the sharp-curve-traveling detector detects an initiation and a termination of traveling of the electric motor-assisted bicycle along the sharp curve in the tilted state; and
the motor controller is configured or programmed to perform a different control of the assist force during a period of time that is based on at least one of the initiation and the termination of traveling of the electric motor-assisted bicycle along the sharp curve in the tilted state.

10. The electric motor-assisted bicycle according to claim 9, wherein the motor controller is configured or programmed to perform the different control of the assist force during a predetermined period of time after the termination of traveling of the electric motor-assisted bicycle along the sharp curve in the tilted state.

11. An electric motor-assisted bicycle comprising:
a vehicle body motion sensor to detect a change in an attitude of a vehicle body of the electric motor-assisted bicycle relative to a road surface;

a torque sensor to detect a pedal force on a pedal connected to a crankshaft of the electric motor-assisted bicycle;

a motor to generate an assist force to be added to the pedal force;

a motor controller configured or programmed to control the assist force applied by the motor depending on the pedal force; and a sharp-curve-traveling detector to detect that the electric motor-assisted bicycle is traveling along a sharp curve in a tilted state in which the vehicle body is tilted relative to an upright state to a left or right, based on information acquired by the vehicle body motion sensor; wherein the motor controller is configured or programmed to control the assist force depending on a detection result from the sharp-curve-traveling detector; and the sharp-curve-traveling detector detects that the electric motor-assisted bicycle is traveling along the sharp curve in the tilted state if a yaw angle or a yaw angular velocity of the electric motor-assisted bicycle is not lower than a first threshold, and a pitch angle or a pitch angular velocity of the electric motor-assisted bicycle is not lower than a second threshold.

12. The electric motor-assisted bicycle according to claim 11, wherein at least one of the first threshold and the second threshold changes depending on a vehicle speed of the electric motor-assisted bicycle.

13. The electric motor-assisted bicycle according to claim 11, wherein the motor controller is configured or programmed to modify control of the assist force when the electric motor-assisted bicycle is detected as traveling along the sharp curve in the tilted state.

14. The electric motor-assisted bicycle according to claim 13, wherein the motor controller is configured or programmed to control the motor such that the assist force is smaller when the electric motor-assisted bicycle is detected as traveling along the sharp curve in the tilted state than when the electric motor-assisted bicycle is not detected as traveling along the sharp curve in the tilted state.

15. The electric motor-assisted bicycle according to claim 11, wherein the sharp-curve-traveling detector detects an initiation and a termination of traveling of the electric motor-assisted bicycle along the sharp curve in the tilted state; and the motor controller is configured or programmed to perform a different control of the assist force during a period of time that is based on at least one of the initiation and the termination of traveling of the electric motor-assisted bicycle along the sharp curve in the tilted state.

16. The electric motor-assisted bicycle according to claim 15, wherein the motor controller is configured or programmed to perform the different control of the assist force during a predetermined period of time after the termination of traveling of the electric motor-assisted bicycle along the sharp curve in the tilted state.

17. A motor control apparatus for controlling a motor that generates an assist force to be added, as assistance, to a pedal force on a pedal of an electric motor-assisted bicycle, the motor control apparatus comprising:

a motor controller configured or programmed to control the assist force applied by the motor depending on the pedal force detected by a torque sensor; and a sharp-curve-traveling detector to detect that the electric motor-assisted bicycle is traveling along a sharp curve in a tilted state in which the vehicle body is tilted to a left or right relative to an upright state, based on a combination of (a) a yaw angle or a yaw angular velocity of the electric motor-assisted bicycle and (b) a pitch angle or a pitch angular velocity of the electric motor-assisted bicycle, or a combination of (c) a roll angle or a roll angular velocity of the electric motor-assisted bicycle and (b) the pitch angle or the pitch angular velocity of the electric motor-assisted bicycle acquired by a vehicle body motion sensor; wherein the motor controller is configured or programmed to control the assist force depending on a detection result from the sharp-curve-traveling detector.

\* \* \* \* \*